United States Patent
Odhner

[15] 3,687,557
[45] Aug. 29, 1972

[54] METHOD FOR DETERMINING THE CONCENTRICITY OF WIRE WITHIN ITS COATING OF INSULATION

[72] Inventor: Oliver Randolph Odhner, Gerloff Rd. R.D. 2, Schwenksville, Pa. 19473

[22] Filed: Nov. 2, 1970

[21] Appl. No.: 85,935

[52] U.S. Cl. ..................356/156, 29/407, 350/81, 350/90, 350/320
[51] Int. Cl. ..............................................G01b 11/08
[58] Field of Search ...29/407; 73/150; 356/156, 171; 350/81, 86, 90, 320

[56] References Cited
UNITED STATES PATENTS 3,208,271 9/1965 Thompson...................73/150
2,786,389 3/1957 Bennett et al. ...............350/86

*Primary Examiner*—Ronald L. Wibert
*Assistant Examiner*—Jeff Rothenberg
*Attorney*—Carl A. Hechmer, Jr. and Earl T. Reichert

[57] ABSTRACT

Insulated wire is stripped to obtain a piece of insulation, and the piece of insulation cut and vertically mounted under a prefocused microscope to view the end of the insulation in order to determine the concentricity of the insulation with the wire formerly contained therein; these steps are accomplished with a single apparatus, and eliminate refocusing the microscope for each sample of insulation inspected.

3 Claims, 8 Drawing Figures

PATENTED AUG 29 1972 3,687,557
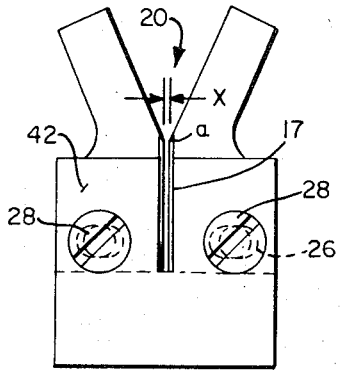
Fig. 2
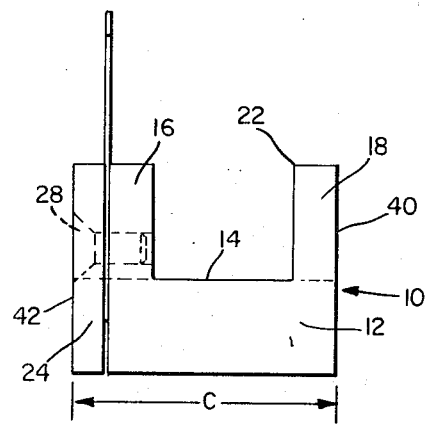
Fig. 1
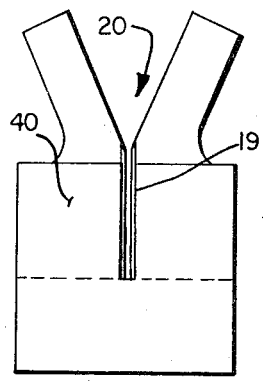
Fig. 3
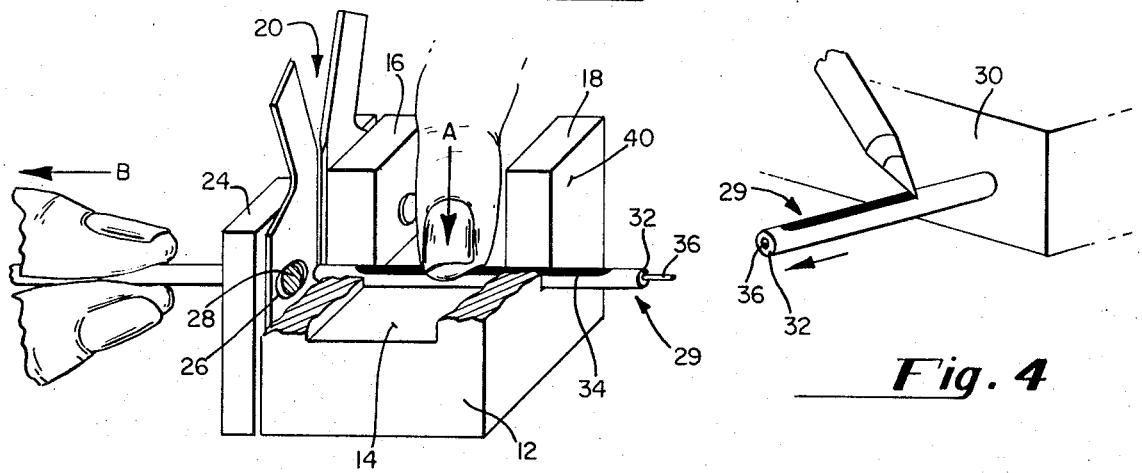
Fig. 5
Fig. 4
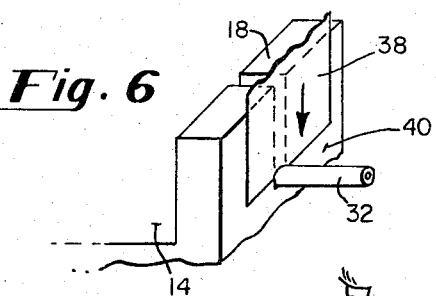
Fig. 6
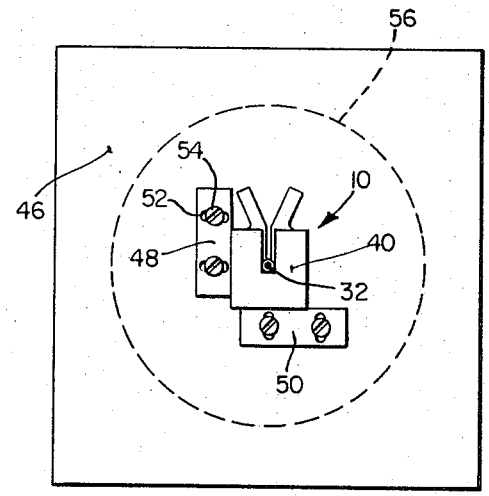
Fig. 8
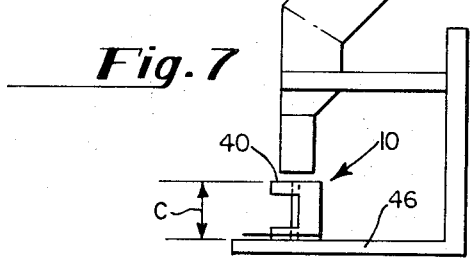
Fig. 7
INVENTOR.
Oliver Randolph Odhner
BY Earl T. Reichert
ATTORNEY.

3,687,557

METHOD FOR DETERMINING THE CONCENTRICITY OF WIRE WITHIN ITS COATING OF INSULATION

BACKGROUND OF THE INVENTION

This invention relates to insulated wire, but more particularly to a means for, and method of determining the concentricity of a wire with the insulation surrounding or coating it.

The insulation is applied to the wire by means of an extruder. As the wire exits the extruder, it is necessary from time to time to select a sample, and determine whether or not the coating operation is being accurately carried out, i.e., whether or not the wire and insulation surrounding it are concentric with each other. If not, the extruder must be adjusted in the proper direction to remedy the situation. In order to do this the insulated wire must be oriented with respect to the extruder as it exits the latter, so that if adjustments in the extruder are necessary they can be made in the proper direction.

Several methods are presently used to determine concentricity of wire with its insulated coating. Electronic devices are available which continuously measure the position of the wire by detecting the capacitance of electrodes touching the surface of the insulation; this method does not work well on small wires such as AWG 30 gauge.

A common practice is to cut off a length of insulated wire, and examine its cross section under a microscope. Cutting through both the insulation and the wire as is often done, leaves the insulation marred or obscured by the slashed copper wire contained therein. At other times, the insulation is first stripped from the wire and a segment of the insulation is then mounted in a holder to be placed under a microscope; this latter method is more reliable than the previous one. However, both methods take many minutes by the time the stripping, cutting, mounting, and focusing are done. Also, once it is determined that the wire is not concentric with the insulation, it still may not be known in which direction to adjust the extruder to remedy the situation.

SUMMARY OF THE INVENTION

The present invention relates generally to both a means for, and method of determining the concentricity of wire with the insulation surrounding it, which combines the stripping, cutting, and mounting steps, while eliminating focusing the microscope each time a sample of the insulation per se is examined; also, the direction of any non-concentricity is determined by orienting or marking the insulated wire as it exits from the extruder, thereby allowing the extruder to be quickly adjusted in the proper direction.

The means for accomplishing the above includes a generally U-shaped sampler, this sampler being adapted for combining the above mentioned stripping, cutting, and mounting steps, the sampler being placed directly under a microscope for viewing the sample of the insulation per se which is mounted within the sampler. Means are also provided to accurately locate this sampler under the microscope so that the end view of the sample being observed is in the exact center of the field of view of the microscope.

BRIEF DESCRIPTION OF THE DRAWINGS

FIG. 1 is a front view of a U-shaped sampler embodiment of the present invention.

FIG. 2 is an end view of the sampler showing adjustably mounted stripping blades, and the screws for adjusting these blades.

FIG. 3 is a second end view of the sampler showing the cutting face along which a cutting blade is passed to obtain a predetermined length of insulation for viewing under a microscope.

FIG. 4 illustrates the marking of insulated wire as it exits from an extruder, thus orienting the wire with respect to the extruder.

FIG. 5 illustrates the stripping of the insulation from a length of insulated wire which has been placed in the sampler.

FIG. 6 illustrates cutting a piece of insulation remaining in the sampler to a predetermined length.

FIG. 7 shows the sampler placed beneath a microscope with a sample of insulation mounted therein for viewing.

FIG. 8 illustrates means for mounting the sampler under a microscope so that the end of the insulation sample being observed is located exactly in the center of view of the field of view of the microscope.

DESCRIPTION OF THE PREFERRED EMBODIMENT

Referring to FIG. 1, it can be seen that a generally U-shaped sampler (an embodiment of the present invention) is designated generally by the numeral 10, and is comprised of a base 12 having an upper horizontal surface 14, a first leg 16 extending upwardly form one end thereof, and a second leg 18 extending upwardly from a second end thereof. Leg 16 has a vertical slot 17, and leg 18 a vertical slot 19, each of these slots extending from the top of its respective leg to surface 14 of the base.

Referring to FIGS. 2 and 5, it can be seen that a pair of stripper blades 20 are mounted within leg 16. Sampler 10 is comprised of a U-portion 22, and an end plate 24, blades 20 being mounted within leg 16 between U-portion 22, and end plate 24. It will be noted that each of the blades 20 is provided with a slot 26, sampler 10 having two screws 28 which extend through plate 24, slots 26, and are threadably connected into U-portion 22. In this manner, blades 20 can be adjusted to vary the gap or distance $x$ between the cutting edges of the blades. Preferably, this gap gradually tapers inwardly from point $a$ adjacent to the top of slot 17, to the bottom of slot 17; at point $a$ this gap is equal to or slightly greater than the overall diameter of the wire per se and the insulation surrounding it while at the bottom of slot 17 the gap is equal to or slightly greater than the diameter of the wire per se. Thus, as a length of insulated wire is pushed between blades 20, it will have only the insulation cut, and not the wire per se.

In describing the method for determining the concentricity of the wire with its insulation by utilizing sampler 10, reference is made to FIGS. 4 through 7.

As the wire 36 exits from the extruder 30 it is coated with insulation 32, a mark 34 is inscribed on the top side of the insulated wire 31 to orient it with respect to the extruder. By marking the insulated wire in this manner the extruder can later be quickly and accurately adjusted in the desired direction. A length of the marked insulated wire is then cut off, this length of insulated wire then being placed within sampler 10 as shown in FIG. 5. The insulated wire is pushed between blades 20 in the direction of the arrow A toward surface 14, cutting insulation 32, but not the wire per se 36. As explained above this is because blades 20 are spaced apart so that by the time the insulated wire reaches the bottom of slot 17, insulation 32, but not the wire 36 has been cut. The insulated wire may be rotated with the fingers to insure that the insulation 32 is cut entirely around its 360° periphery.

The finger of the one hand then pushes the insulated wire toward surface 14 as is shown in FIG. 5, while the fingers of the other hand pull the wire in the direction of the arrow B, leaving behind a piece of hollow marked insulation 32. It is in this manner that the insulated wire is grasped on opposite sides of blades 20 and pulled in opposite directions. A sharp cutting blade 38 is then passed along end surface 40, cutting insulation 32 on the plane of surface 40. Thus, a very clean and accurate cut through the insulation is made, thereby obtaining a good surface for viewing under a microscope. It is here noted that end surface 40 along which the cutter blade 38 is passed, is parallel to the opposite end surface 42, the distance between these end surfaces designated as C being constant and of any desired length. In the present embodiment this distance is one inch. End surfaces 42 and 40 are also designated as first and second end surfaces respectively, these surfaces being perpendicular to surface 14. Whatever the length of distance C, microscope 44 (FIG. 7) is previously adjusted to focus on an object (in this case an end of an insulation sample) placed this predetermined distance above the stage 46 (the table for supporting the object to be viewed) of the microscope. Still holding the sample of insulation within the sampler 10 as it was cut, the sampler, and sample of insulation contained therein, is placed on stage 46 under the lens of the microscope 44 with surface 40 facing in an upward direction.

Thus, since each of the end surfaces 40 and 42 are parallel, and perpendicular to the surface 14 of the base 12, the sample of insulation is placed in a vertical position very suitable for viewing. The upper end of the sample of insulation is co-planar with the surface 40, this surface being placed upwardly as mentioned above. Because the microscope has been previously adjusted to focus on an object placed at this predetermined distance above the stage 46, it is not necessary to refocus the microscope from one sample to another. Sampler 10 may be shifted about on stage 46 of the microscope until the end of the insulation is in the center of the field of view of the microscope.

Any non-concentricity noted is referenced to the mark on the insulation sample, and since the mark was made on the top of the insulated wire as it left the extruder, it is an easy matter to adjust the extruder in the proper direction.

Referring to FIG. 8, there is illustrated a means for accurately and quickly locating sampler 10 so that the sample of insulation is exactly in the center of the field of view of the microscope. This means comprises two adjustable guide bars 48 and 50, each of the guide bars having slots 52 and screws 54 to position the guide bars so that sampler 10 is located in such a manner that the insulation sample is exactly in the center of the field of view of the microscope. The guide bars may be mounted on the stage 46 of the microscope, or a separate plate may be utilized on which to mount the guide bars, the plate then being affixed to the stage of the microscope. The center of the field of view is concentric with dotted line 56.

Thus it can be seen that a very effective means has been devised for combining the stripping, cutting and mounting steps into one easy overall operation. This eliminates the need for performing each of these steps separately, thus eliminating much needless fumbling and focusing of the microscope from sample to sample. Other means might also be utilized to practice the method set forth herein.

What is claimed is:

1. A method for viewing, under a microscope, the end of a sample of insulation formerly covering a wire, in order to determine the concentricity of the insulation with the wire comprising:
   a. adjusting the microscope to focus on an object placed at a predetermined distance above the stage or supporting table of the microscope;
   b. cutting only through the insulation of a length of insulated wire at a first point thereon;
   c. grasping the insulated wire on opposite sides of said first point and pulling in opposite directions, leaving behind a piece of insulation per se;
   d. perpendicularily cutting completely through the piece of insulation at a second point spaced from said first point by said predetermined distance to obtain a sample of insulation suitable for viewing the cross section thereof under the microscope;
   e. placing the sample of insulation under the microscope in a vertical position, locating said second point at said predetermined distance above the stage or supporting table of the microscope.

2. The method according to claim 1, and further including the step of locating the sample of insulation at the center of the field of view of the microscope.

3. A method for viewing, under a microscope, the end of a sample of insulation formerly covering a wire and deposited on the latter by an extruder, in order to determine the concentricity of the insulation with the wire comprising:
   a. adjusting the microscope to focus on an object placed at a predetermined distance above the stage or supporting table of the microscope;
   b. marking the insulated wire as it exits the extruder so as to orient it with respect to the extruder;
   c. cutting off a length of the marked insulated wire;
   d. cutting only through the insulation of the length of insulated wire at a first point thereon;
   e. grasping the insulated wire on opposite sides of said first point and pulling in opposite directions, in a manner such as to leave behind a piece of marked insulation pr se;
   f. perpendicularily cutting completely through the piece of insulation at a second point spaced from said first point by said predetermined distance in a manner such as to obtain a sample of marked insulation suitable for viewing the cross section thereof under a microscope;

g. placing the marked sample of insulation under the microscope in a vertical position, locating said second point at said predetermined distance above the stage or supporting table of the microscope.

* * * * *

PO-1050
(5/69)

UNITED STATES PATENT OFFICE
CERTIFICATE OF CORRECTION

Patent No. 3,687,557                    Dated August 29, 1972

Inventor(s) Oliver Randolph Odhner

It is certified that error appears in the above-identified patent and that said Letters Patent are hereby corrected as shown below:

After the Title, "[54] Method For Determining The Concentiricity of Wire Within Its Coating of Insulation", insert - [73] Assignee: Pennwalt Corporation, Philadelphia, Pa. -

Signed and sealed this 3rd day of April 1973.

(SEAL)
Attest:

EDWARD M. FLETCHER, JR.                ROBERT GOTTSCHALK
Attesting Officer                       Commissioner of Patents